United States Patent
Coe et al.

(10) Patent No.: US 9,935,478 B2
(45) Date of Patent: Apr. 3, 2018

(54) MANAGING RENEWABLE POWER GENERATION

(71) Applicant: Younicos Inc., Kyle, TX (US)

(72) Inventors: Carlos James Coe, San Marcos, TX (US); Aeron Neils Hurst, Martindale, TX (US); Mark Isaac Hardin, Austin, TX (US); Matthew Clayton Such, Austin, TX (US); Richard Thomas Jennings, San Antonio, TX (US)

(73) Assignee: YOUNICOS, INC., Kyle, TX (US)

( * ) Notice: Subject to any disclaimer, the term of this patent is extended or adjusted under 35 U.S.C. 154(b) by 188 days.

(21) Appl. No.: 14/931,108

(22) Filed: Nov. 3, 2015

(65) Prior Publication Data

US 2016/0056642 A1 Feb. 25, 2016

Related U.S. Application Data

(63) Continuation of application No. 13/924,888, filed on Jun. 24, 2013, now Pat. No. 9,209,640, which is a (Continued)

(51) Int. Cl.
*H02J 7/00* (2006.01)
*H02J 3/38* (2006.01)
(Continued)

(52) U.S. Cl.
CPC .............. *H02J 7/007* (2013.01); *G05B 15/02* (2013.01); *H02J 3/383* (2013.01); *H02J 3/386* (2013.01); *H02J 3/32* (2013.01); *H02J 3/382* (2013.01); *Y02E 10/563* (2013.01); *Y02E 10/566* (2013.01); *Y02E 10/763* (2013.01); *Y10T 307/516* (2015.04); *Y10T 307/527* (2015.04); *Y10T 307/625* (2015.04)

(58) Field of Classification Search
CPC ... G05B 15/02; H02J 3/32; H02J 3/382; H02J 3/383; H02J 3/386; H02J 7/007
USPC ................................. 320/101; 307/46, 48, 66
See application file for complete search history.

(56) References Cited

U.S. PATENT DOCUMENTS

| 5,274,571 A | 12/1993 | Hesse et al. |
| 5,369,353 A | 11/1994 | Erdman |

(Continued)

FOREIGN PATENT DOCUMENTS

| EP | 1938436 | 7/2008 |
| FR | 2865081 | 7/2005 |

(Continued)

OTHER PUBLICATIONS

Third Office Action for Chinese Application No. 201180030425.1 dated Jan. 5, 2016, 26 pages.

(Continued)

*Primary Examiner* — Nathaniel Pelton
(74) *Attorney, Agent, or Firm* — Toler Law Group, PC (57) ABSTRACT

A power delivery rate from a renewable power source to a load is managed by determining, by processing circuitry, a change in a power generation rate, determining, by the processing circuitry, whether the change in the power generation rate exceeds a limit, and then, adjusting, by control circuitry, a power transfer rate to or from a power storage device, such that the adjusting is sufficient to prevent the power delivery rate from exceeding the limit.

20 Claims, 6 Drawing Sheets

Related U.S. Application Data continuation of application No. 12/773,504, filed on May 4, 2010, now Pat. No. 8,471,520.

(51) Int. Cl.
*G05B 15/02* (2006.01)
*H02J 3/32* (2006.01)

(56) References Cited

U.S. PATENT DOCUMENTS

| | | | |
|---|---|---|---|
| 5,563,802 A | 10/1996 | Plahn et al. |
| 5,710,501 A | 1/1998 | Van Phuoc et al. |
| 6,313,611 B1 | 11/2001 | Mowry et al. |
| 6,522,031 B2 | 2/2003 | Provanzana et al. |
| 6,580,977 B2 | 6/2003 | Ding et al. |
| 6,674,265 B2 | 1/2004 | Yoshida et al. |
| 6,747,370 B2 | 6/2004 | Abe |
| 6,858,953 B2 | 2/2005 | Stahlkopf |
| 6,900,556 B2 | 5/2005 | Provanzana et al. |
| 7,002,260 B2 | 2/2006 | Stahlkopf |
| 7,227,275 B2 | 6/2007 | Hennessy et al. |
| 7,265,456 B2 | 9/2007 | Hennessy |
| 7,298,059 B2 | 11/2007 | Delmerico et al. |
| 7,353,083 B2 | 4/2008 | Hennessy |
| 7,432,611 B2 | 10/2008 | Stahlkopf |
| 7,613,548 B2 | 11/2009 | Cardinal et al. |
| 7,622,816 B2 | 11/2009 | Stahlkopf |
| 7,679,215 B2 | 3/2010 | Delmerico et al. |
| 7,826,908 B2 | 11/2010 | Cheng et al. |
| 7,890,217 B2 | 2/2011 | Cardinal et al. |
| 7,908,036 B2 | 3/2011 | Kirchner et al. |
| 7,941,246 B2 | 5/2011 | Miller et al. |
| 7,952,232 B2 | 5/2011 | Burra et al. |
| 8,159,186 B2 | 4/2012 | Iida et al. |
| 8,159,188 B2 | 4/2012 | Anderson |
| 8,185,249 B2 | 5/2012 | Kirchner et al. |
| 8,222,765 B2 | 7/2012 | Collins et al. |
| 8,237,301 B2 | 8/2012 | Delmerico et al. |
| 8,277,964 B2 | 10/2012 | Hennessy |
| 8,301,311 B2 | 10/2012 | Nelson |
| 8,335,547 B2 | 12/2012 | Otterson |
| 8,338,987 B2 | 12/2012 | O'Brien et al. |
| 8,344,550 B2 | 1/2013 | Delmerico et al. |
| 8,373,312 B2 | 2/2013 | O'Brien et al. |
| 8,400,112 B2 | 3/2013 | Anderson |
| 8,452,461 B2 | 5/2013 | Sawyer et al. |
| 8,471,406 B2 | 6/2013 | Patel et al. |
| 8,532,834 B2 | 9/2013 | Delong et al. |
| 2005/0134237 A1 | 6/2005 | Sasaki et al. |
| 2008/0224541 A1* | 9/2008 | Fukuhara .......... H02J 3/32 307/48 |
| 2009/0006901 A1* | 1/2009 | Brey .......... G06F 1/206 714/47.1 |
| 2009/0184835 A1 | 7/2009 | Deaver et al. |
| 2010/0057267 A1 | 3/2010 | Liu et al. |
| 2010/0145533 A1 | 6/2010 | Cardinal et al. |
| 2011/0001318 A1 | 1/2011 | Nelson |
| 2011/0187106 A1 | 8/2011 | Ichinose et al. |
| 2011/0221276 A1 | 9/2011 | Geinzer et al. |
| 2011/0245987 A1 | 10/2011 | Pratt et al. |
| 2011/0273129 A1 | 11/2011 | Coe et al. |
| 2012/0056588 A1 | 3/2012 | Cai et al. |
| 2012/0248873 A1 | 10/2012 | Oudalov et al. |
| 2013/0249215 A1 | 9/2013 | Egedal et al. |
| 2013/0257351 A1 | 10/2013 | Yasuyuki et al. |
| 2013/0278203 A1 | 10/2013 | Coe et al. |

FOREIGN PATENT DOCUMENTS

| | | |
|---|---|---|
| JP | 2010022122 | 1/2010 |
| WO | WO 2007/046547 | 4/2007 |
| WO | WO 2009/136975 | 11/2009 |
| WO | WO 2013/068149 A2 | 5/2013 |

OTHER PUBLICATIONS

Notice of Allowance regarding EP Application No. 11721164.9 dated Mar. 31, 2015.
Authorized Officer Bianca Radisch, International Search Report and Written Opinion of the International Searching Authority for Application No. PCT/US2011/035030 dated Nov. 28, 2011, 7 pages.
Authorized Officer Tuomas Kauko, International Preliminary Report for PCT/US2011/035030 dated Aug. 22, 2012, 5 pages.

* cited by examiner

MANAGING RENEWABLE POWER GENERATION

CROSS-REFERENCE TO RELATED APPLICATIONS

This application is a Continuation of U.S. patent application Ser. No. 13/924,888, filed Jun. 24, 2013, which is a Continuation of U.S. patent application Ser. No. 12/773,504, filed May 4, 2010 (now U.S. Pat. No. 8,471,520). The entire disclosures of U.S. patent application Ser. No. 13/924,888 and U.S. patent application Ser. No. 12/773,504 are incorporated by reference herein.

TECHNICAL FIELD

This invention relates to managing power delivery, and more particularly to managing power generated from renewable resources.

BACKGROUND

Renewable resources, such as wind, wave, and solar energy, are an attractive alternative to the use of fossil fuels in generating power due to their renewable nature and clean operation. However, unlike thermal power plants (e.g., coal-fired or natural gas fired plants), generally, the amount of wave, wind, or solar energy available at any given time can not be controlled or reliably predicted. Further, due to the inherent variability of these renewable energy sources, (e.g., wind gusts and/or directional changes, weather conditions, etc.), the instantaneous power output of an associated power generator (e.g., a wind turbine) may vary significantly from one second to the next.

SUMMARY

In a first aspect, a power delivery rate from a renewable power source to a load is managed by determining, by processing circuitry, a change in a power generation rate, determining, by the processing circuitry, whether the change in the power generation rate exceeds a limit, and then, adjusting, by control circuitry, a power transfer rate to or from a power storage device, such that the adjusting is sufficient to prevent the power delivery rate from exceeding the limit. Other implementations of this aspect include corresponding systems, apparatus, and computer programs, configured to perform the actions of the methods, encoded on computer storage devices.

In another aspect, a control system for a bidirectional power device coupled to a dynamic power source converting renewable energy into electrical power includes: a storage device having stored thereon machine-readable instructions specifying a ramp rate control operation; a set of I/O ports configured to receive information regarding the bidirectional power device and the dynamic power source; a processor coupled to the set of I/O ports and the storage device and configured to execute the machine-readable instructions to perform operations including: determining a change in a power generation rate; determining whether the change in the power generation rate exceeds a limit; and then, adjusting a power transfer rate to or from the bidirectional power device, wherein the adjusting is sufficient to prevent the power delivery rate from exceeding the limit.

These and other embodiments can each optionally include one or more of the following features. Managing the power delivery rate can include determining, by the processing circuitry, a present state-of-charge of the power storage device, and adjusting the limit, by the processing circuitry, based on the present state-of-charge of the power storage device. The limit can include a ramp rate limit associated with increases in the power generation rate and adjusting the limit can include: setting the ramp rate limit to a minimum value if the present state-of-charge is less than a minimum state-of-charge; setting the ramp rate to a maximum value if the present state-of-charge is greater than a maximum state-of-charge; and setting the ramp rate to a value between the minimum value and the maximum value if the present state-of-charge is neither less than the minimum state-of-charge nor greater than the maximum state-of-charge. The limit can include a ramp rate limit associated with decreases in the power generation rate and adjusting the limit can include: setting the ramp rate limit to a minimum value if the present state-of-charge is greater than a maximum state-of-charge; setting the ramp rate to a maximum value if the present state-of-charge is less than a minimum state-of-charge; and setting the ramp rate to a value between the minimum value and the maximum value if the present state-of-charge is neither less than the minimum state-of-charge nor greater than the maximum state-of-charge. The limit can include a first ramp rate associated with increases in the power generation rate and a second ramp rate associated with decreases in the power generation rate, and adjusting the limit can include: setting the first ramp rate to a maximum value and the second ramp rate to a minimum value if the present state-of-charge exceeds a maximum state-of-charge. Adjusting the power transfer rate to or from the power storage device can include: increasing the power transfer rate from the power storage device to match a decrease in the power generation rate in excess of the second ramp rate; and setting the power transfer rate to the power storage device to match the increase in the power generation rate in excess of the first ramp rate. The limit can include a first ramp rate associated with increases in the power generation rate and a second ramp rate associated with decreases in the power generation rate, and adjusting the limit can include: setting the first ramp rate to a minimum value and the second ramp rate to a maximum value if the present state-of-charge falls below a minimum state-of-charge. Adjusting the power transfer rate to or from the power storage device can include: increasing the power transfer rate to the power storage device to match an increase in the power generation rate in excess of the first ramp rate; and setting the power transfer rate from the power storage device to match the decrease in the power generation rate in excess of the second ramp rate.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Rapid increases in power output can be managed to some degree by manipulating the wind turbine and/or its controls (e.g., yawing or tilting the plane of rotation, varying the blade pitch, using a passive/active stall mechanism, controlling the output of a variable-speed generator, etc.). However, intentionally reducing power output despite the availability of wind energy (i.e., curtailment) decreases the overall energy efficiency of the system. Similarly, preemptively reducing the power output of a wind turbine generator so that a sudden decrease in wind energy appears less abrupt also decreases the overall energy efficiency of the system. Such reductions in power output may be necessary to avoid exceeding a ramp rate limit for delivering power to a load (e.g., a utility grid) and/or for accommodating a power generation schedule based on expected demand.

Figure 1:
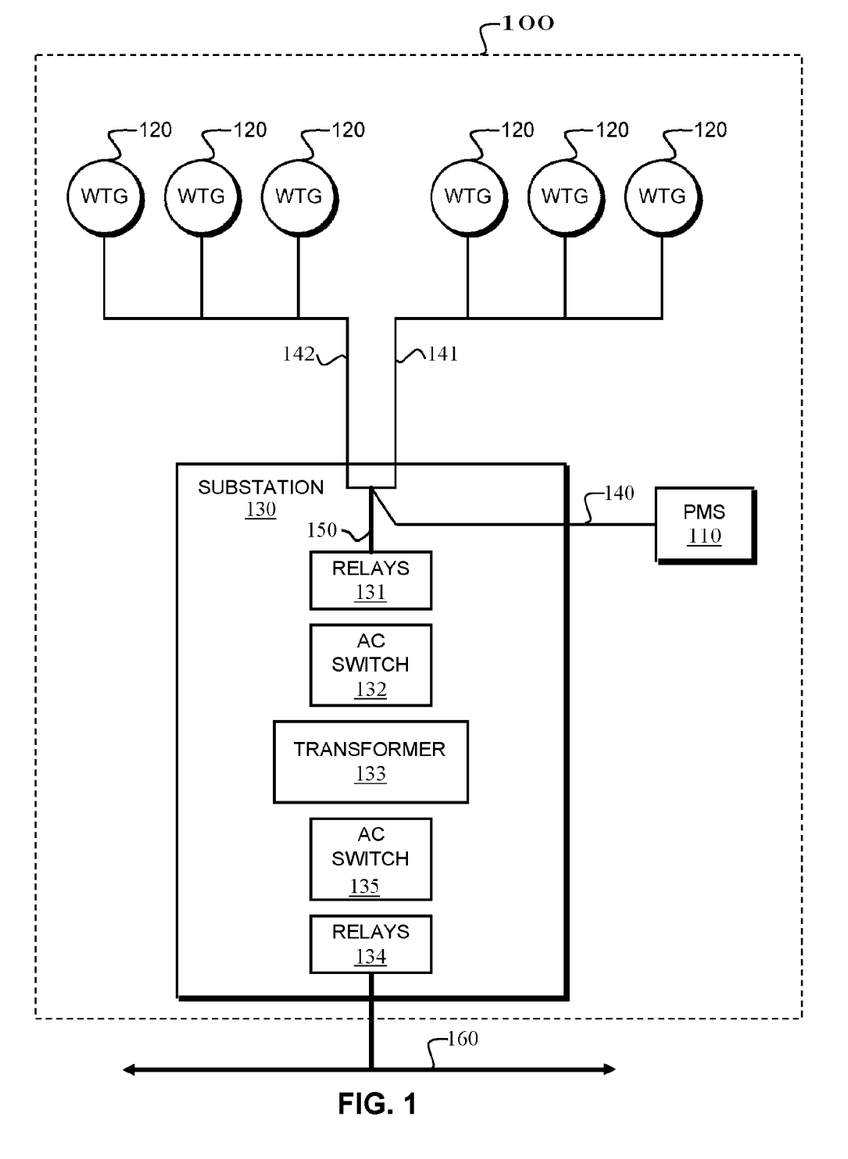
FIG. 1 illustrates a wind farm including a power management system.

FIG. 1 illustrates a wind farm 100 including a power management system (PMS) 110. As described in more detail below, PMS 110 provides energy storage and management to automatically buffer the output of wind turbine generators (WTGs) 120 to distribution network 160 (e.g., a utility grid). In particular, PMS 110 is operable to minimize or eliminate curtailment, smooth overall power output, limit power ramps, and buffer large wind speed excursions (i.e., wind gusts). In instances where frequent wind gusts cause WTGs 120 to trip or go off-line (i.e. a fault event), PMS 110 is further operable to compensate for the sudden disruption in power output by supplementing the power output to avoid or mitigate a ramp rate violation associated with the negative power ramp.

The exemplar wind farm configuration illustrated in FIG. 1 shows PMS 110 coupled to substation 130 through radial feeder 140 of substation main bus 150 (e.g., a 34.5 KV or medium voltage electrical network). WTGs 120 are also coupled to substation main bus 150 through corresponding radial feeders 141, 142. Substation 130 couples PMS 110 and WTGs 120 to distribution network 160 (e.g., a high voltage electrical network) via protective relays 131, 134, AC switchgears 132, 135, and step-up power transformer 133. Protective relays 131, 134 and AC switchgears 132, 135 provide a first level of protection from excessively high voltage or current conditions. In some implementations, substation 130 may also include multiple step-up transformers, breakers, relays, current transducers (CT), potential transducers (PT), communication equipment, etc.

In general, PMS 110 monitors the instantaneous power output from each WTG 120 and adjusts the amount of power delivered to distribution network 160 by storing or supplying power such that the net amount of power delivered to network 160 remains within predetermined limits. In addition, PMS 110 is operable to condition the generated power so as to reduce the variability typically associated with wind generated power (i.e., smoothing). In some implementations, PMS 110 provides a second level of protection to the wind farm components, and/or distribution network 160 and components coupled to the transfer network. For example, in a first implementation, PMS 110 is configured to monitor the quality and characteristics of power being distributed on network 160 and responsive to detecting an out-of-limit condition (e.g., overvoltage, fault, voltage sag, etc.), PMS 110 attempts to compensate by adjusting the transfer of power to distribution network 160. These and other features are described in further detail below.

Figure 2:
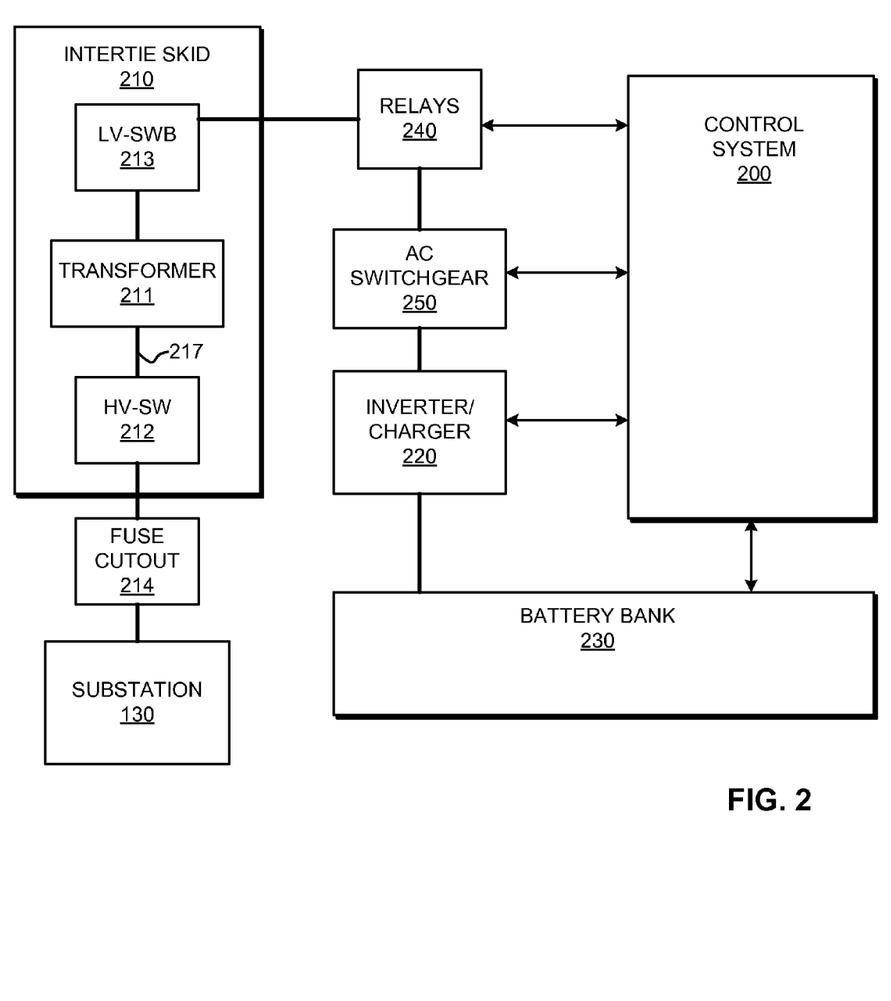
FIG. 2 illustrates an exemplar power management system.

Referring now to FIG. 2, an exemplar implementation of PMS 110 includes intertie skid 210 and control system 200 coupled to inverter/charger 220 for controlling the transfer of power to and from battery bank 230 responsive to the control algorithms executed by the control system. Control system 200 is also coupled to protective relays 240 and AC switchgear 250 to monitor fault conditions and alarms. Control system 200 coordinates the operation of the system components, including inverter/charger 220 and battery bank 230, monitors the operating environment, provides diagnostic capabilities, and manages the overall system operation in response to setup parameters entered via a status and control interface or human-machine interface (HMI). In some implementations, control system 200 includes remote operation terminals for receiving user programmable parameters related to the wind farm power output and for displaying information related to various monitored parameters. The programmable parameters include, for example, limits and targets associated with power smoothing, power storage, target state-of-charge and corresponding limits, etc.

Intertie skid 210 includes a 34.5 KV to 480/277 V substation transformer 211, a high voltage fused switch 212, and a low voltage switchboard 213 and serves to couple the rest of PMS 110 to substation 130 via substation main bus 150. The 34.5 KV power is provided to intertie skid 210 from a fuse cutout 214 attached to substation main bus 150. Three #4/0 35 KV shielded cables 215 are protected by the fuse element in fuse cutout 214 and are terminated in a high voltage (HV) fused switch 212. Fused switch 212 includes station type lightning arrestors on the incoming feed. The fuses in fused switch 212 are sized to protect transformer 211. The primary of transformer 211 is fed by three #1/0 35 KV shielded cables 217. The secondary of transformer 211 is connected to low voltage switchboard 213 via fifteen 750 kcmil 600 V cables (5 per phase) and a 300 Amp trip (100% rated) main breaker.

Figure 3:
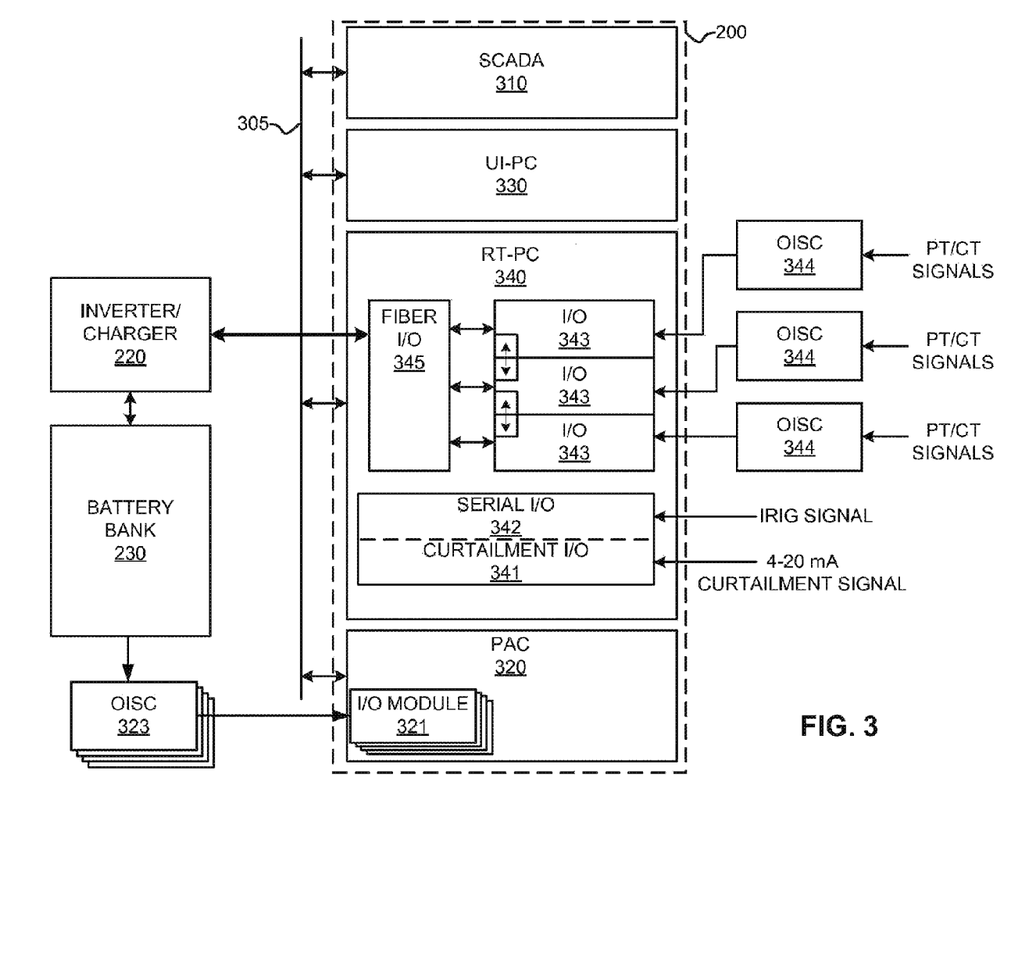
FIG. 3 illustrates an exemplar control system for a power management system.

As illustrated in FIG. 3, control system 200 includes supervisory control and data acquisition (SCADA) system 310, user interface PC (UI-PC) 330, real-time control processor (RT-PC) 340, and various controllers and sensors. UI-PC 330 provides a primary user interface to accept user requests, provide warning or error indications, and to receive user programmable control parameters. RT-PC 340 coordinates the remaining elements of PMS 110. Various control elements are responsible for controlling and monitoring specific system sub-functions. The various control elements are connected via Ethernet network 305. Each link is monitored for correct operation via the use of semaphores which include "deadman" timers. If a link becomes impaired or fails, the system takes appropriate action, including, for example, shutting down PMS 110 if the control operation is compromised.

RT-PC 340 controls inverter/charger 220 using the parameters received from the user via UI-PC 330, data from inverter/charger 220, and data from the other components, including, for example, current transducers, potential transducers, curtailment signals, etc. A curtailment signal represents a request from the utility operator to curtail power output from the wind farm via a curtailment interface 341 and/or serial interface 342. For example, curtailment interface 341 is coupled to a 4-20 mA current loop interface to receive a curtailment request. The detected current level at the interface is proportional to the total power output from the wind farm such that a 20 mA signal represents a request for full power output and 4 mA represents a request for full curtailment. RT-PC 340 also receives an Inter-Range Instrumentation Group (IRIG) signal via serial interface 342. The IRIG signal provides a reliable time reference.

RT-PC 340 also includes input-output (I/O) modules 343 (e.g., I/O FPGA cards) for receiving currents and potentials from corresponding transducers via optically-isolated signal conditioners (OISC) 344. I/O modules 343 are coupled together to allow data to be transmitted and received between the modules, and thus, allow them to perform as a single unit. I/O modules 343 are also coupled directly to inverter/charger 220 via fiber optic Ethernet interface 345.

Battery bank 230 includes multiple dry cell battery packs connected in a parallel/series configuration to create a single battery bank having a predetermined nominal voltage and Amp-Hour capacity. For example, in some implementations the battery bank includes 72 12-Volt battery packs connected in series to create a battery bank having a nominal voltage of 864 Volts. Each battery pack includes 15 12-Volt dry cell batteries connected in parallel. The batteries are connected in such a way as to ensure that each battery in each battery pack receives a similar or equal voltage at a positive terminal of the respective battery relative to a single reference point. In some implementations, connections are made using precision cabling to provide a uniform DC environment. For example, U.S. patent application Ser. No. 11/549,013, incorporated herein by reference, describes batteries connected in parallel via respective and distinct conductive paths, each conductive path having an under-load resistance differing from an under-load resistance of each other path by less than about 1 milli-ohm.

Battery bank 230 is monitored by programmable automation controller (PAC) 320. PAC 320 includes multiple I/O modules 321 coupled to the outputs of signal conditioning boards 323. Signal conditioning boards 323 provide optical isolation for multiple battery sense points in battery bank 230. For example, each battery pack (i.e., parallel string of batteries) includes a voltage sensor 322 coupled in parallel with the battery pack. The output of each voltage sensor 322 is coupled to a corresponding one of eight signal conditioning boards 323, each board having nine or more differential input channels and one or more outputs. PAC 320 monitors battery bank 320 gathering battery data and sending it to RT-PC 340 periodically (e.g., once per second). In some implementations, PAC 320 includes a compact chassis housing a single-board computer, multiple FPGA-based data acquisition modules, serial interfaces, and Ethernet interfaces (e.g., a National Instruments Corp. CompactRIO system).

Inverter/Charger 220 includes a three-phase sinusoidal pulse-width modulated inverter operating in current-controlled mode to generate three-phase sinusoidal output currents with low total harmonic distortion (THD). Insulated-gate bipolar transistor (IGBT) modules 221 are used as switching devices and are coupled to battery bank 230 via an LF/CF-filter 222 to reduce the ripple current in the DC-source. Inverter/Charger 220 enables the bidirectional transfer of power between battery bank 230 and distribution network 160 via intertie skid 210 and substation 130. For example, depending upon the wind farm grid status, battery status, and the operating parameters, inverter/charger 230 transfers power between a 480 VAC three phase interface with intertie skid 210 and battery bank 230. Inverter/Charger control signals are received from Embedded Control and Acquisition Device (ECAD) 350 which is coupled to RT-PC 340 via an Ethernet link. ECAD 350 receives input commands, including, for example, target levels for active (P) and reactive (Q) power, wind farm grid status information, from control points in the grid and intertie skid. ECAD 350 is configured to respond directly to grid disturbances requiring immediate action without any intervention from other components within control system 200 to minimize response time.

Figure 4:
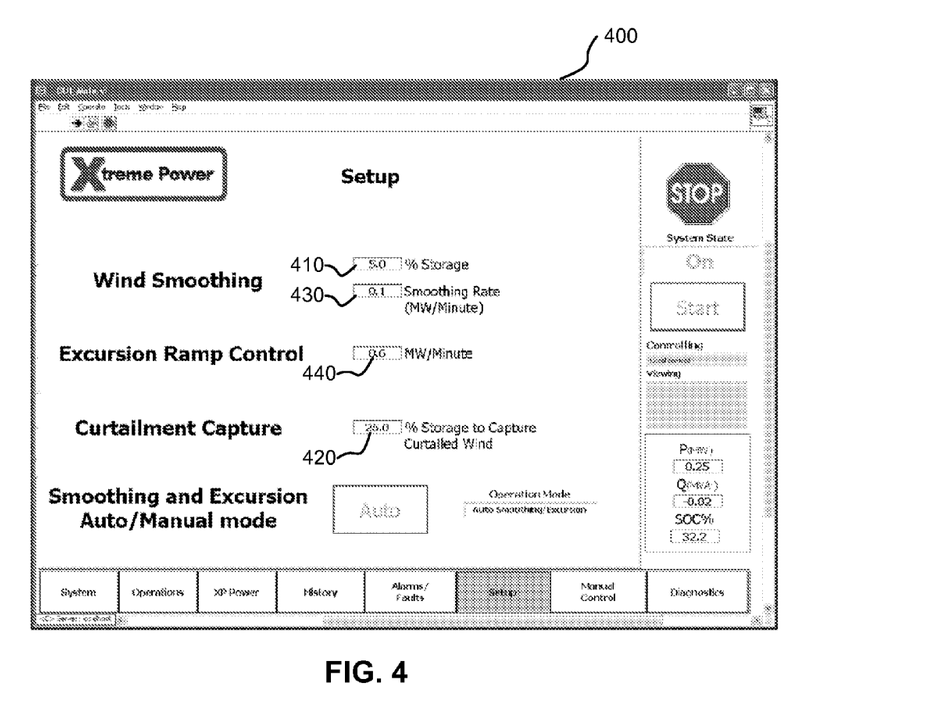
FIG. 4 illustrates a graphical user interface.

Referring now to FIG. 4, an exemplary setup/administration screen 400 of UI-PC 330 is illustrated. This screen enables the user to configure system parameters including, for example, the target percent of storage capacity to use in smoothing 410 and curtailment 420 operations and the maximum rates at which the power flow to the grid is allowed to change during smoothing 430 and excursion 440 control operations.

The wind smoothing parameters define the operating limits for smoothing operations including threshold rates of change and a percent of storage capacity to use. For example, if 10% is selected for "% Storage," battery bank 230 will be charged or discharged 5% around the nominal operating point (i.e., target state-of-charge) to provide smoothing operations. Further, if the "Smoothing Rate" parameter is set to 0.1 MW/min, the system will not attempt to smooth transitions which occur below this rate. The ramp control parameters define the maximum rate at which the net power output to distribution network 160 is allowed to change in any direction. In some implementations, a single value sets both positive (increasing output) and negative (decreasing output) ramp rate limits. As described in more detail below, the wind smoothing and ramp control algorithms in some implementations include control mechanisms to keep the batteries in the normal operating range, limiting the smoothing and excursion operations as the battery state of charge nears normal operating limits (including, for example, maximum charge capacity and/or maximum depletion).

In addition to smoothing and ramp rate parameters, screen 400, in some implementations, enables the user to configure a curtailment capture parameter 420 to set the percent storage capacity to be used for storing power that would otherwise be curtailed by the wind turbine generators. For example, setting the capture parameter 420 to 10% reserves 10% of battery bank capacity to store energy in response to curtailment requests from a utility operator or utility grid control system. Power that would otherwise be curtailed is stored by PMS 110 within predetermined operating parameters (i.e., maximum capacity and current battery state-of-charge).

Figure 5:
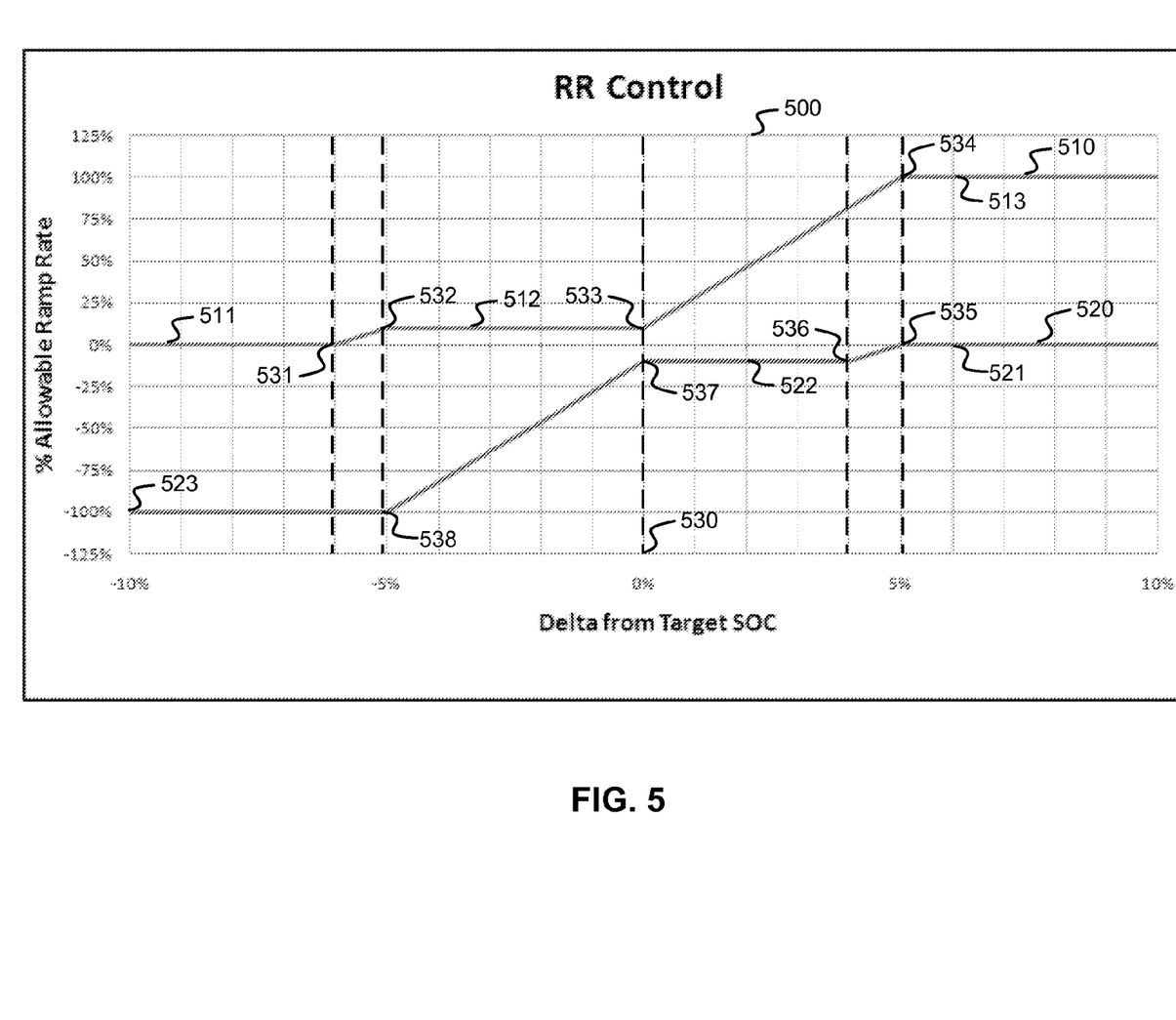
FIG. 5 illustrates an exemplar ramp rate bias control function.

FIG. 5 illustrates an exemplar implementation of PMS 110 operating under a first set of conditions. For example, PMS 110 is configured to buffer wind power variability by providing a steady output of power at rates changing no more than a maximum allowable ramp rate for excursion control (e.g., sudden ramps in power due to, for example, wind gusts) and a smoothing ramp rate during smoothing control, thus improving output reliability while enabling more effective grid management and creating more easily dispatchable power. In this implementation, the algorithms implemented by control system 200 are based on parameters that represent the second to second power output of the wind farm. Other time scales may be used for power sources having more or less variability or for coarser control of power output.

The WTG parameter represents the total wind turbine output (WTG$_1$+WTG$_2$+ . . . +WTG$_n$) at time t (seconds). The upward-ramp-rate (UpRR) and the downward-ramp-rate (DownRR) parameters represent the maximum allowable rate of change in power output (e.g., KW/sec) from wind farm 100. In some implementations, the UpRR and DownRR values are fixed (e.g., for excursion mitigation without smoothing or for constant smoothing). In other implementations, such as the present example, the UpRR and DownRR values are variable between a minimum (e.g., zero, a smoothing limit (SmthRR), a percentage of the maximum, etc.) and a maximum (e.g., a maximum input rate of PMS 110, an Excursion ramp rate limit (ExcRR), a percentage thereof, etc.) and depend on the available capacity of PMS 110. The XP parameter represents the amount of power required (in or out) from PMS 110 to mitigate UpRR or DownRR violations. The SystemOut parameter represents the sum of WTG and XP at time t (WTG.sub.t+XP.sub.t).

The DeltaP parameter represents the difference between WTG at time t and SystemOut at time t−1 (WTG.sub.t−SystemOut.sub.t−1). DeltaP can also be understood to represent the potential net change in SystemOut assuming PMS 110 stopped contributing at time t (i.e., DeltaP.sub.t=WTG.sub.t−WTG.sub.t−1−XP.sub.t−1). A negative DeltaP indicates a potential decrease in system output and a positive DeltaP indicates a potential increase in system output. If the potential increase/decrease in system output would not violate either UpRR or DownRR, no contribution by XP is necessary at time t. However, if |DeltaP| is greater than UpRR or |DownRR|, PMS 110 will contribute by absorbing or providing the difference in magnitude to avoid or mitigate ramp rate violations and/or to smooth power output, depending on available system capacity.

In some implementations, the maximum amount of power absorbed or supplied by PMS 110 is gradually reduced as battery bank 230 approaches a maximum state of charge or minimum state of charge. In such a case, XP is limited to the lesser of the scaled maximum output/input and the required contribution to avoid the ramp rate violation (i.e., |XP|=MIN (|ScaledPowerLimit|, |DeltaP−Up/DownRR|)). Such an approach may be useful, for example, to mitigate the ramp rate violations over a longer period of time than would otherwise be possible due to capacity limitations and/or to extend the useful life of PMS 110.

The XP_Energy parameter represents the amount of energy required to be transferred to/from PMS 110 at time t to absorb/supply XP. In some implementations, XP_Energy is determined using trapezoidal integration to find the area under the curve: [XP.sub.t−1+XP.sub.t]/2*(1/3600). Finally, the SOC.sub.t parameter represents the state of charge of battery bank 230 at time t (SOC.sub.t−1−(XP_Energy/ 1000*SystemSize), where SystemSize represents the capacity of battery bank 230 in MWh).

The following pseudo-code illustrates an example algorithm for controlling the amount of power (XP) absorbed or supplied by PMS 110. Other pseudo-code, languages, operations, orders of operations, and/or numbers may be used.

| PMS Power Transfer Control Logic | |
|---|---|
| XP = | power required from XP system at time t (positive = sourcing; negative = absorbing) to maintain UpRR or DownRR |
| DeltaP = | Difference of total system output from time t − 1 and total turbine output at time t (positive indicates a potential net increase in total system output if XP contribution = 0; negative indicates a potential net decrease in total system output if XP contribution = 0) |
| UpRR = | Up ramp rate limit (function of $SOC_{t-1}$) |
| DownRR = | Down ramp rate limit (function of $SOC_{t-1}$) |
| SystemMax = | maximum power input/output for XP system |
| Power_In = | Scaling factor for maximum power input |
| Power_Out = | Scaling factor for maximum power output |
| SOCt = | State of Charge at time t |
| SOC_Max = | Maximum allowable state of charge |
| SOC_Min = | Minimum allowable state of charge |
| Rech_DB = | value used to set the upper limit to begin scaling power input |
| Disch_DB = | value used to set the lower limit to begin scaling power output |
| Rech_Exp = | exponent used to define curve for allowable power input after $SOC_t$ exceeds Rech_DB |
| Disch_Exp = | exponent used to define curve for allowable power output after $SOC_t$ exceeds Disch_DB |

```
IF DeltaP > UpRR THEN
    IF SOC_t > SOC_Max THEN
        Power_In = 0
    ELSEIF SOC_t < Rech_DB THEN
        Power_In = 1
    ELSE
        Power_In = 1− [(SOC_t − Rech_DB)/(SOC_Max − Rech_DB)]^Rech_Exp
    ENDIF
    IF (DeltaP − UpRR) > Power_In*SystemMax THEN
        XP = − Power_In*SystemMax
    ELSE
        XP = −(DeltaP − UpRR)
    ENDIF
ELSEIF DeltaP < DownRR THEN
    IF SOC_t < SOC_Min THEN
        Power_Out = 0
    ELSEIF SOC_t > Disch_DB THEN
        Power_Out = 1
    ELSE
        Power_Out = 1 − [(Disch_DB − SOC_t)/(Disch_DB − SOC_Min)]^Disch_Exp
    ENDIF
    IF (DownRR − DeltaP) > Power_Out*SystemMax THEN
        XP = Power_Out*SystemMax
```

PMS Power Transfer Control Logic

```
    ELSE
        XP = (DownRR - DeltaP)
    ENDIF
ELSE
    XP = 0
ENDIF
```

Thus, if, without contribution from PMS 110, the net change in system output from time t−1 to time t would be greater than the up ramp rate limit, PMS 110 absorbs (i.e., negative XP value): (i) nothing if SOC.sub.t is greater than the maximum allowable state of charge (i.e., XP=Power_In*SystemMax=0 since DeltaP−UpRR would be greater than zero) and the ramp rate violation is allowed to occur; (ii) the required amount to prevent a violation, up to the system maximum if SOC.sub.t is less than the set point for scaling down power input; or (iii) the required amount to prevent a violation, up to the scaled system maximum (i.e., Power_In*SystemMax).

Further, if, without contribution from PMS 110, the net change in system output from time t−1 to time t would be less than the down ramp rate limit (i.e., exceeding a negative rate of change limit), PMS 110 provides (i.e., positive XP value): (i) nothing if SOC.sub.t is less than the minimum allowable state of charge (i.e., XP=Power_Out*SystemMax=0 since DownRR−DeltaP would be greater than zero); (ii) the required amount to prevent a violation, up to the system maximum if SOC.sub.t is greater than the set point for scaling down power output; or (iii) the required amount to prevent a violation, up to the scaled system maximum (i.e., Power_Out*SystemMax).

As described above, in some implementations, the values for UpRR and DownRR depend on the state-of-charge (SOC) of the battery bank at time t. FIG. 5 illustrates an exemplary ramp rate control chart 500 for adjusting UpRR and DownRR according to the current SOC of the battery bank (e.g., battery bank 230 of FIG. 2). In this example, a target SOC value 530 (e.g., 50%) serves as a reference point for the UpRR and DownRR control algorithms. Deadband limits define an area or band where no change is made to the corresponding values (e.g., UpRR 510 and/or DownRR 520). Transition limits define the upper and/or lower bounds beyond which the corresponding limit is set to the MinRR or MaxRR value. The ramp rate control algorithms attempt to keep the current SOC within +/−DB of the target SOC by adjusting UpRR and DownRR to increase charging/discharging of the battery bank.

Referring first to positive rates of change in power output from the renewable energy source, UpRR 510 is assigned a value between a minimum ramp rate (MinRR) 511 (e.g., 0% of the maximum desired ramp rate), a secondary ramp rate (SecRR) 512 (e.g., 10% of the maximum desired ramp rate), and a maximum ramp rate 513 (MaxRR) (e.g., 100% of the maximum desired ramp rate) based on the current SOC value. Setting MinRR, SecRR, and MaxRR to pre-programmed percentages of the maximum desired ramp rate allows the ramp rates to be automatically defined based on a single value (e.g., an excursion ramp rate limit, a desired smoothing ramp rate, etc.).

In some implementations, the percentage settings for each of the ramp rates (MinRR, SecRR, MaxRR) and/or the ramp rate values themselves may be entered directly, providing more advanced control. Further, in some implementations, target SOC 530, and the SOC limits associated with the corresponding ramp rate limits (e.g., UpRR and/or DownRR) are individually configured for up ramp rates and for down ramp rates to provide for additional customization. For example, ramp rate controls and/or limits may be implemented to mitigate only one type of ramp rate violation, such as, for example, an up ramp rate. Such implementations may include an additional PMS 110, battery bank 230, or alternate power source, for example, to supplement power output during decreases in WTG total power output.

Referring to UpRR 510 in FIG. 5, when the current SOC is exactly equal to target SOC 530, UpRR is equal to SecRR 512. In this example, UpRR deadband limits 532 and 533 are −5% and 0% of target SOC 530, respectively. Therefore, while the current SOC remains within this range, UpRR remains equal to SecRR 512. Beyond this range, UpRR 510 transitions to MinRR 511 or MaxRR 513 depending on the current SOC. For example, if the current SOC drifts below lower DB limit 532, UpRR 510 will be set to a value between SecRR 512 and MinRR 511. As a result, PMS 110 will absorb a larger portion of any positive increases in generated power to increase the current SOC. Once the current SOC drifts below lower transition limit 531, UpRR 510 is set to MinRR 511. In this example, MinRR 511 is equal to 0% of the allowable ramp rate limit which allows any positive increase in generated power to be redirected to or absorbed by battery bank 230, increasing the current SOC and resulting in no net increase in power output to the load.

If, however, the current SOC drifts beyond the upper DB limit 533 (which is also the target SOC 530 in this example), UpRR 510 will be set to a value between SecRR 512 and MaxRR 513. As a result, PMS 110 will absorb less charge during any positive increases in generated power to slow the increase in the current SOC. Consequently, greater increases in generated power or up ramp rates will be seen by the load. Once the current SOC drifts past upper transition limit 534, UpRR 510 is set to MaxRR 513. In this example, MaxRR 513 is set to 100% of the allowable ramp rate limit. Some implementations include additional upper DB limits 533 and/or transition limits 534. For example, in some implementations, MaxRR 513 is set to a value between SecRR and 100% of the allowable ramp rate limit when the current SOC drifts past the first upper transition limit 534. Once the current SOC drifts past a second upper transition limit 534 (not shown), MaxRR is set to 100% of the allowable ramp rate. In this way, the UpRR control algorithm provides for multiple levels of SOC control and/or ramp rate control.

Referring now to DownRR 520 in FIG. 5, when the current SOC is exactly equal to target SOC 530, DownRR is equal to SecRR 522. In this example, DownRR deadband limits 537 and 536 are 0% and 4% of target SOC, respectively. Therefore, while the current SOC remains within this range, DownRR remains equal to SecRR 522. Beyond this range, DownRR 520 transitions to MinRR 521 or MaxRR 523 depending on the current SOC. For example, if the current SOC drifts beyond the upper DB limit 536, DownRR 520 will be set to a value between SecRR 522 and MinRR 521. As a result, PMS 110 will provide (i.e., discharge) more and more supplemental power to decrease the current SOC by limiting any negative change in power delivered to the load. Once the current SOC drifts past upper transition limit 535, DownRR 520 is set to MinRR 520. In this example, MinRR 520 is equal to 0% of the allowable ramp rate limit which allows any decrease in generated power output to be supplied by battery bank 230, decreasing the current SOC and resulting in no net decrease in power output to the load.

If, however, the current SOC drifts below lower DB limit 537, DownRR 520 will be set to a value between SecRR 522 and MaxRR 523. Consequently, PMS 110 will allow greater negative ramp rates to be seen by the load as the current SOC continues to decline. Once the current SOC drifts below lower transition limit 538, DownRR 520 is set to MaxRR 523. In this example, MaxRR 523 is set to 100% of the allowable ramp rate limit. Some implementations include additional lower DB limits 538 and/or transition limits 538. For example, in some implementations, MaxRR 523 is set to a value between SecRR and 100% of the allowable ramp rate limit when the current SOC drifts past the first lower transition limit 538. Once the current SOC drifts past a second transition limit 538 (not shown), MaxRR 523 is set to 100% of the allowable ramp rate. In this way, the DownRR control algorithm provides for multiple levels of SOC control and/or ramp rate control.

The various combinations of ramp rate limits and SOC limits allow PMS 110 to maximize charge/discharge in the direction that will aggressively push the SOC of battery bank 230 back towards the target SOC while mitigating any ramp rate violations. Further, the UpRR and DownRR control algorithms effectively help maintain system stability and prevent large depth of discharge cycles. Additionally, the probability of violating a ramp rate limit and the severity of any ramp rate violations are greatly reduced assuming PMS 110 is appropriately sized based on the power generation capability of the power source and the associated variability.

In some implementations, the non-transitioning ramp rate is set to zero before the transitioning ramp rate reaches MaxRR. This provides more aggressive control of SOC by maintaining a constant power output during any change in the total generated output opposite the transitioning direction. For example, if UpRR is transitioning towards MaxRR (i.e., current SOC is increasing), DownRR is set to zero such that any decrease in generated power (e.g., WTG) is immediately supplemented by power from PMS 110 (effectively decreasing SOC). Similarly, if DownRR is transitioning towards MaxRR (i.e., current SOC is decreasing), UpRR is set to zero such that any increase in generated power is transferred to PMS 110 (effectively increasing SOC).

The following pseudo-code illustrates another example algorithm for up and down ramp rate control. In this example, the upper DB limit for UpRR is given by SOCTgt+DB and the lower DB limit for DownRR is given by SOCTgt−DB. The lower DB limit for UpRR and the upper DB limit for DownRR are both equal to the target SOC. In addition, MaxRR, SecRR, and MinRR limits are applied to both UpRR and DownRR with corresponding sign notations as appropriate. Determinations are made based on the state of charge at time t−1 rather than the current state of charge so that the results for UpRR and DownRR at time t can be fed forward to the PMS Power Transfer Control Logic described above. Other pseudo-code, languages, operations, orders of operations, and/or numbers may be used.

Up and Down Ramp Rate Control Logic

```
SOCTgt = Target SOC
SOCt − 1 = SOC at previous second or t − 1
DB = deadband limit
UpRR = ramp rate limit applied when the power output from the wind farm is increasing
DownRR = ramp rate limit applied when the power output from the wind farm is decreasing
MaxRR = ramp rate applied if SOC passes outside DB limit
SecRR = ramp rate used if SOC within DB limit
DroopGain = gain used when SOC is between SOCTgt and DB; equal to (MaxRR − SecRR)/DB
IF SOC_{t−1} < (SOC_{Tgt} − DB) THEN
    DownRR = −MaxRR
    UpRR = 0
ELSEIF (SOC_{Tgt} − DB) < SOC_{t−1} < SOC_{Tgt} THEN
    DownRR = −(SecRR + (SOC_{Tgt} − SOC)*DroopGain)
    UpRR = SecRR
ELSEIF SOC_{Tgt} < SOC_{t−1} < (SOC_{Tgt} + DB) THEN
    DownRR = −SecRR
    UpRR = SecRR + (SOC_{t−1} − SOC_{Tgt})*DroopGain
ELSEIF (SOC_{Tgt} + DB) < SOC_{t−1} THEN
    DownRR = 0
    UpRR = MaxRR
ENDIF
```

Additional or fewer ramp rate limits are used in different implementations, depending on the intended purpose and configuration of PMS 110 and/or the renewable power source serviced by PMS 110. For example, in at least one implementation, MinRR corresponds to 5% of an excursion limit (ExcRR), SecRR corresponds to 10% of ExcRR, and MaxRR corresponds to 70% of ExcRR. UpRR and DownRR are stepped up or down to equal the appropriate ramp rate limit based on the SOC at time t−1. The table below provides an exemplary algorithm for assigning UpRR and DownRR based on the SOC at time t−1, the target SOC, and deadband limits +/−DB1 and +/−DB2.

| SOC Region | DownRR | UpRR |
| --- | --- | --- |
| $SOC_{t-1} < SOC_{Tgt} - DB2$ | −ExcRR | 0 |
| $SOC_{Tgt} - DB2 \leq SOC < SOC_{Tgt} - DB1$ | −SmthRR | MinRR |
| $SOC_{Tgt} - DB1 \leq SOC \leq SOC_{Tgt} + DB1$ | −SecRR | SecRR |
| $SOC_{Tgt} + DB1 < SOC \leq SOC_{Tgt} + DB2$ | −MinRR | SmthRR |
| $SOC_{t-1} > SOC_{Tgt} + DB2$ | 0 | ExcRR |

In other implementations, the ramp rates are individually assigned a value and transition regions are defined to smooth the ramp rate transition from a first value to the next. In addition, some implementations include logic and/or routines for handling certain types of events. For example, frequent and/or severe wind gusts may cause one or more wind turbine generators to trip or go offline to avoid component damage. This event is recognized as a fault event to which PMS 110 responds by providing sufficient power to maintain the current operation (e.g., smoothing and/or ramp rate control). A determination may be made that normal operation will resume momentarily based on information, such as, for example, average sustained wind speeds, frequency of wind gusts, expected changes in weather, and other meteorological data). Based on the determination, the normal ramp rate control algorithm may be suspended allowing the current SOC to drop below the deadband limit without decreasing the power provided. In some implementations, the target SOC is adjusted temporarily according to the weather conditions.

In some implementations, PMS 110 is configured to generate a curtailment signal based on the current SOC of battery bank 230. For example, in addition to limiting the amount of power absorbed when $SOC_{t-1} > SOC_{Tgt} + DB2$, PMS 110 generates a curtailment signal which when received by WTGs 120 causes the WTGs to implement curtailment measures, such as, e.g., yawing or tilting the plane of rotation, varying the blade pitch, etc., further reducing the probability of an UpRR violation. This may be useful, for example, for re-enabling or maintaining power smoothing operations during periods of frequent excursions.

As described above, in addition to ramp control and smoothing operations, PMS 110 also provides the ability to capture curtailed wind power in order to increase operating efficiency and overall wind farm capacity. For example, during low demand periods (typically late at night and/or early in the morning), the utility may constrain the output of the wind turbine generators to balance the grid supply with demand. Depending on the value of the curtailment signal and the strength of the wind, the operating efficiency of the wind farm can be significantly reduced during curtailment periods. PMS 110 is operable to absorb the excess capacity without modifying any curtailment mechanisms that may already be in place.

For example, WTGs 120 and PMS 110 are each configured to detect when the curtailment signal value decreases below the wind farm's potential output. Responsive to the detection, WTGs 120 immediately adjust to reduce the net output of the wind farm to a value below or equal to the curtailment value. Once PMS 110 determines the net output of the wind farm is equal to the curtailment value, it begins to absorb power from the wind farm at a user programmable rate (e.g., 600 kW/min or 10 kW/sec) slightly reducing the total output of the wind farm. If additional wind energy is available, WTGs 120 increase net power output until the curtailment level is reached once again. During this time the power absorbed by PMS 110 remains constant. The process repeats as long as there is excess wind power to be gathered and the curtailment signal value is less than the wind farm's potential output (based on current wind speeds). If, during the curtailment period, the wind power suddenly decreases below the curtailment signal value, PMS 110 stops absorbing power and immediately begins supplying power to maintain a net output having a rate of change less than or equal to the maximum ramp rate (e.g., −ExcRR).

Each time the process is repeated, the amount of power absorbed by PMS 110 (PAbsorbed) increases and the excess amount of available wind power (PAvailable) decreases. The "potential wind power" (PPotential) is equal to the power that could be generated by the wind farm if there were no curtailment restrictions and no power was absorbed by PMS 110. PLimit represents the curtailment signal value. Thus, PAvailable=PPotential−PLimit−PAbsorbed. Once PAvailable is equal to zero, no additional power is available for PMS 110 to absorb. If PAvailable becomes less than zero, PMS 110 stops absorbing power and immediately begins supplying power to maintain a net output having a rate of change less than or equal to the maximum ramp rate.

User programmable system parameters set the percentage of the storage capacity to be dedicated to capture curtailed wind power during certain periods of the day, week, year, etc., and the percentage of the storage capacity to be dedicated for smoothing and excursion control. When the storage capacity allocated for curtailment is full, PMS 110 will continue smoothing and excursion control. PMS 110 will release the energy stored during curtailment at the first available opportunity at the maximum allowable rate. The opportunity to release energy to the grid when not in curtailment (i.e., PLimit=PPotential) is determined by comparing PPotential with the total capacity of the wind farm.

Figure 6:
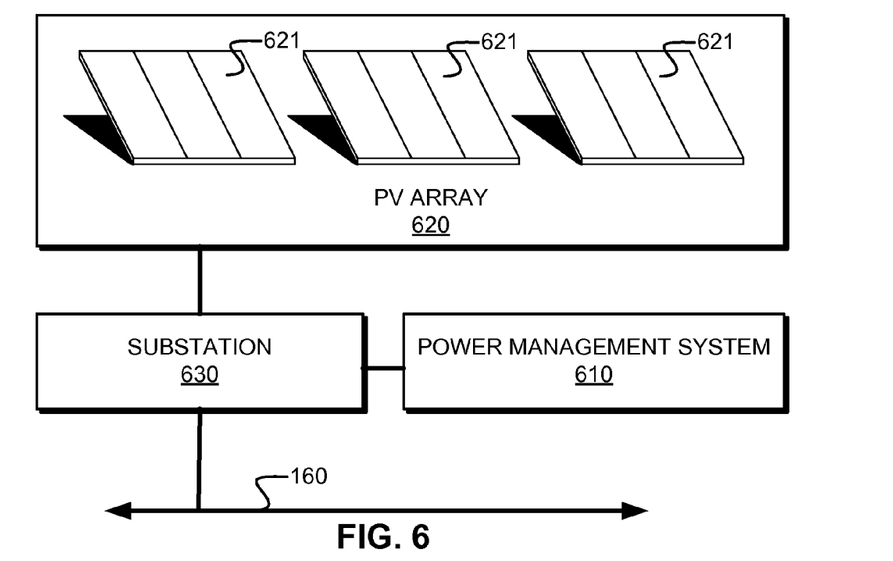
FIG. 6 illustrates an exemplar photovoltaic park including a power management system.
Figure 7:
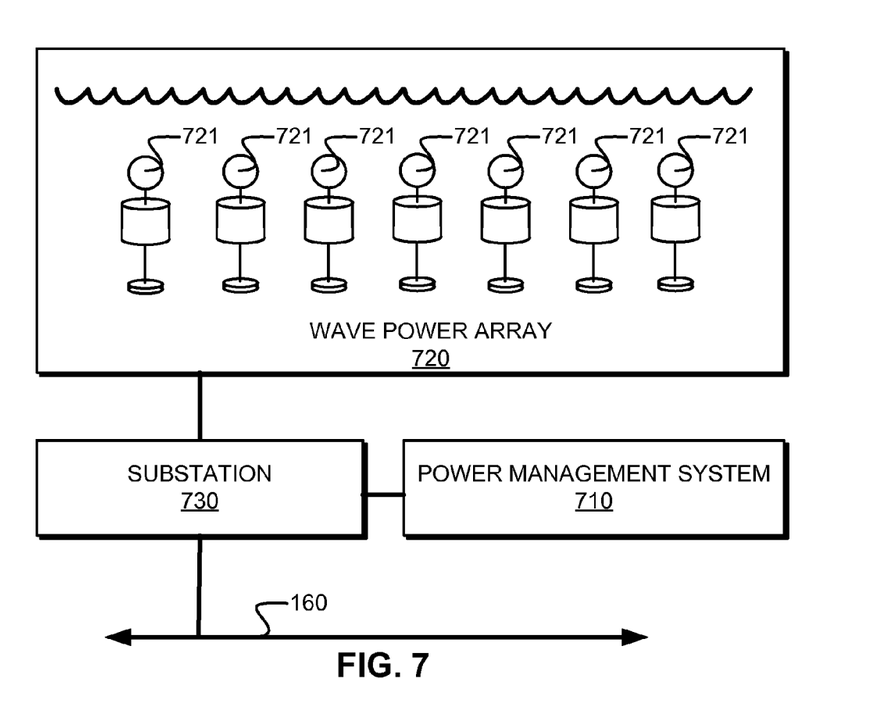
FIG. 7 illustrates an exemplar wave park including a power management system.

FIGS. 6 and 7 illustrate exemplary implementations power management systems 610, 710 (e.g., PMS 110 described above) for providing excursion, smoothing, and curtailment control/operations for photovoltaic (PV) parks including PV panels 621 in PV array 620 and for wave power parks including power generators 721 in wave power array 720, respectively.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software.

One or more embodiments include an article of manufacture that includes a tangible machine-accessible and/or machine-readable medium having stored thereon instructions, that if executed by a machine (e.g., an execution unit) causes the machine to perform the operations described herein. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof. Still other embodiments pertain to a computer system, embedded system, or other electronic device having an execution unit configured to perform one or more of the operations disclosed herein.

A number of embodiments of the invention have been described. Nevertheless, it will be understood that various modifications may be made without departing from the spirit and scope of the invention. For example, solar and/or geothermal energy may be used instead of or in addition to wind energy to provide renewable energy. Further, the capacity, measurement resolution, response time, and limits described above are merely exemplar values. Accordingly, other embodiments are within the scope of the following claims.

What is claimed is:

1. A method comprising:
   determining, by processing circuitry, a predicted rate of change of a power output during a time period, the power output corresponding to a sum of a first power output of at least one renewable power source and an amount of power provided to or supplied by a power storage device; and
   in response to determining that the predicted rate of change exceeds a limit, wherein the limit is non-zero, adjusting, by control circuitry, a power transfer rate to or from the power storage device; and
   in response to determining that the predicted rate of change is less than or equal to the limit, setting the power transfer rate to or from the power storage device such that power from the at least one renewable power source is not provided to or supplied by the power storage device, wherein the predicted rate of change is non-zero.

2. The method of claim 1, further comprising determining the predicted rate of change based on a difference between the first power output at an end of the time period and a sum of the first power output and the amount of power at a beginning of the time period.

3. The method of claim 1, wherein the power transfer rate to or from the power storage device is adjusted such that the rate of change of the power output is less than the limit.

4. The method of claim 1, wherein the limit comprises a ramp rate limit associated with decreases in the power output and the method further comprises:
   setting the ramp rate limit to a first value in response to determining that a state-of-charge of the power storage device is greater than a second state-of-charge threshold;
   setting the ramp rate limit to a second value in response to determining that the state-of-charge of the power storage device is less than a first state-of-charge threshold, wherein the first value is less than or equal to the second value, and wherein the first state-of-charge threshold is less than or equal to the second state-of-charge threshold; and
   setting the ramp rate limit to a value between the first value and the second value in response to determining that the state-of-charge is greater than or equal to the first state-of-charge threshold and less than or equal to the second state-of-charge threshold.

5. The method of claim 1, further comprising setting a first ramp rate limit to a second value and a second ramp rate limit to a first value in response to determining that a state-of-charge of the power storage device exceeds a state-of charge threshold, wherein the first ramp rate limit is associated with increases in the power output, wherein the second ramp rate limit is associated with decreases in the power output, wherein the first value is less than or equal to the second value, and wherein the limit includes the first ramp rate limit or the second ramp rate limit.

6. The method of claim 1, wherein the limit comprises a second ramp rate limit associated with decreases in the power output, and wherein adjusting the power transfer rate to or from the power storage device comprises setting the power transfer rate from the power storage device based on a difference between the predicted rate of change of the power output and the second ramp rate limit.

7. The method of claim 1, wherein the limit comprises a first ramp rate limit associated with increases in the power output, and wherein adjusting the power transfer rate to or from the power storage device comprises setting the power transfer rate to the power storage device based on a difference between the predicted rate of change of the power output and the first ramp rate limit.

8. The method of claim 1, further comprising:
   determining, by the processing circuitry, a state-of-charge of the power storage device; and
   adjusting the limit, by the processing circuitry, based on the state-of-charge of the power storage device.

9. A system comprising:
   a set of input/output (I/O) ports configured to receive information regarding a bidirectional power device and a dynamic power source; and
   a processor coupled to the set of I/O ports and configured to:
      determine a predicted rate of change of a power output during a time period, the power output corresponding to a sum of a first power output of the dynamic power source and an amount of power provided to or supplied by the bidirectional power device;
      determine whether the predicted rate of change exceeds a limit;
      in response to determining that the predicted rate of change exceeds the limit, wherein the limit is non-zero, adjust a power transfer rate to or from the bidirectional power device; and
      in response to determining that the predicted rate of change is less than or equal to the limit, set the power transfer rate to or from the bidirectional power device such that power from the dynamic power source is not provided to or supplied by the bidirectional power device, wherein the predicted rate of change is non-zero, and
      wherein a power delivery rate is an instantaneous net amount of power delivered from at least one of the dynamic power source or the bidirectional power device.

10. The system of claim 9, wherein the processor is further configured to:
    determine a state-of-charge of the bidirectional power device; and
    adjust the limit based on the state-of-charge of the bidirectional power device.

11. The system of claim 9, wherein the limit comprises a ramp rate limit associated with increases in the power output and wherein the processor is further configured to:

set the ramp rate limit to a first value in response to determining that a state-of-charge of the bidirectional power device is less than a first state-of-charge threshold;

set the ramp rate limit to a second value in response to determining that the state-of-charge of the bidirectional power device is greater than a second state-of-charge threshold, wherein the first value is less than or equal to the second value, and wherein the first state-of-charge threshold is less than or equal to the second state-of-charge threshold; and set the ramp rate limit to a value between the first value and the second value in response to determining that the state-of-charge is greater than or equal to the first state-of-charge threshold and less than or equal to the second state-of-charge threshold.

12. The system of claim 9, wherein the limit comprises a ramp rate limit associated with decreases in the power output and wherein the processor is further configured to:

set the ramp rate limit to a first value in response to determining that a state-of-charge of the bidirectional power device is greater than a second state-of-charge threshold;

set the ramp rate limit to a second value in response to determining that the state-of-charge of the bidirectional power device is less than a first state-of-charge threshold, wherein the first value is less than or equal to the second value, and wherein the first state-of-charge threshold is less than or equal to the second state-of-charge threshold; and set the ramp rate limit to a value between the first value and the second value in response to determining that the state-of-charge is greater than or equal to the first state-of-charge threshold and less than or equal to the second state-of-charge threshold.

13. The system of claim 9, wherein the processor is further configured to set a first ramp rate limit to a second value and a second ramp rate limit to a first value in response to determining that a state-of-charge of the bidirectional power device exceeds a state-of-charge threshold, wherein the first ramp rate limit is associated with increases in the power output and the second ramp rate limit is associated with decreases in the power output, wherein the first value is less than or equal to the second value, and wherein the limit comprises the first ramp rate limit or the second ramp rate limit.

14. The system of claim 9, wherein the limit comprises a first ramp rate limit associated with increases in the power output, and wherein adjusting the power transfer rate to or from the bidirectional power device comprises setting the power transfer rate to the bidirectional power device based on a difference between the predicted rate of change of the power output and the first ramp rate limit.

15. The system of claim 9, wherein the processor is further configured to set a first ramp rate limit to a first value and a second ramp rate limit to a second value in response to determining that a state-of-charge of the bidirectional power device is less than a state-of-charge threshold, wherein the first ramp rate limit is associated with increases in the power output and the second ramp rate limit is associated with decreases in the power output, wherein the first value is less than or equal to the second value, and wherein the limit comprises the first ramp rate limit or the second ramp rate limit.

16. The system of claim 9, wherein the limit comprises a second ramp rate limit associated with decreases in the power output, and wherein adjusting the power transfer rate to or from the bidirectional power device comprises setting the power transfer rate from the bidirectional power device based on a difference between the predicted rate of change of the power output and the second ramp rate limit.

17. A non-transitory machine-readable medium having stored thereon instructions that, when executed by a processor, cause the processor to perform operations comprising:

determining a predicted rate of change of a power output during a time period, the power output corresponding to a sum of a first power output of at least one renewable power source and an amount of power provided to or supplied by a power storage device; and in response to determining that the predicted rate of change exceeds a limit, wherein the limit is non-zero, adjusting a power transfer rate to or from the power storage device; and in response to determining that the predicted rate of change is less than or equal to the limit, setting the power transfer rate to or from the power storage device such that power from the at least one renewable power source is not provided to or supplied by the power storage device, wherein the predicted rate of change is non-zero.

18. The non-transitory machine-readable medium of claim 17, wherein the operations further comprise:

determining a state-of-charge of the power storage device; and adjusting the limit based on the state-of-charge of the power storage device.

19. The non-transitory machine-readable medium of claim 17, wherein the limit comprises a ramp rate limit associated with increases in the power output and wherein the operations further comprise:

setting the ramp rate limit to a first value in response to determining that a state-of-charge of the power storage device is less than a first state-of-charge threshold;

setting the ramp rate limit to a second value in response to determining that the state-of-charge of the power storage device is greater than a second state-of-charge threshold, wherein the first value is less than or equal to the second value, and wherein the first state-of-charge threshold is less than or equal to the second state-of-charge threshold; and setting the ramp rate limit to a value between the first value and the second value in response to determining that the state-of-charge is greater than or equal to the first state-of-charge threshold and less than or equal to the second state-of-charge threshold.

20. The non-transitory machine-readable medium of claim 17, wherein the limit comprises a ramp rate limit associated with decreases in the power output and wherein the operations further comprise:

setting the ramp rate limit to a first value in response to determining that a state-of-charge of the power storage device is greater than a second state-of-charge threshold;

setting the ramp rate limit to a second value in response to determining that the state-of-charge of the power storage device is less than a first state-of-charge threshold, wherein the first value is less than or equal to the second value, and wherein the first state-of-charge threshold is less than or equal to the second state-of-charge threshold; and setting the ramp rate limit to a value between the first value and the second value in response to determining that the state-of-charge is greater than or equal to the first state-of-charge threshold and less than or equal to the second state-of-charge threshold.

* * * * *